UNITED STATES PATENT OFFICE.

CLEMENT CAMILLO CITO, OF BRUSSELS, BELGIUM.

PROCESS FOR THE TREATMENT OF COPPER SWEEPS AND SCRAPS.

1,367,768.     Specification of Letters Patent.     Patented Feb. 8, 1921.

No Drawing.     Application filed April 10, 1919. Serial No. 289,130.

*To all whom it may concern:*

Be it known that I, CLEMENT so-called CAMILLO CITO, engineer, subject of the Great Duchy of Luxemburg, residing in Brussels, Belgium, N°. 10 of Rue Henri Marichal, have invented a certain new and useful Improvement in Processes for the Treatment of Copper Sweeps and Scraps, of which the following is a specification.

The invention relates to the treatment of copper sweepings and scraps containing besides copper, zinc, iron, silica or other impurities.

These sweepings and scraps, which are generally the residues of the dressing of sweepings of foundries and copper smelting works, vary in composition according to their origin, the lower and upper limits being, on the average, as follows:

| | | |
|---|---|---|
| Copper | 5–10 | per cent. |
| Zinc | 3– 8 | " |
| Iron | 2– 6 | " |
| Tin any antimony | 1– 2 | " |
| Silica | 75–60 | " |
| Organic matter | 10– 5 | " |

The drawback to treating these copper materials by the ordinary metallurgical process resides generally in the fact that they do not pay for the high working expenses, on account of their low value in copper. Moreover the copper sweepings, being in a state of fine powder, present many difficulties when treated by dry processes.

For a wet process the material is unsuitable, in the first place because the material usually contains too much oily organic matter; and in the second place because all the copper contents are exclusively in the metallic state which resists strongly the solvents generally used.

The new process may include both a dry treatment and a wet treatment.

The first operation consists in a chloridising roasting process, having two objects:

1.—To destroy and expel the oily organic matters;

2.—To transform the entire copper contents present in the state of metal into a copper salt from which the copper is easily recovered.

For this purpose the sweepings and scraps are mixed with a quantity of crude common salt calculated upon the percentage of copper and silica, $SiO_2$. This quantity, however, must not be smaller than 15 per cent. of the gross weight of the material to be treated.

This roasting process is carried out in a two-part furnace, the upper one being a reverberatory furnace and the lower one a muffle furnace.

The conversion of the copper into a salt is due to the reaction occurring during the roasting operation. At a temperature below 600° C. the sodium chlorid reacts with the silica present in the sweepings and liberates chlorin which energetically acts on the heated metallic copper to form cupric chlorid, $CuCl_2$.

By limiting the temperature to 600° C., the whole of the copper contained in the sweepings is retained in the material in the state of cupric chlorid, which may easily be extracted by suitable solvents.

By increasing the temperature above 600° C., the cupric chlorid previously formed at the lower temperature is converted into cuprous chlorid (CuCl), which being very volatile may be entirely expelled from the roasted material and recovered in condensing apparatus.

The second operation, applicable to the cupric chlorid, consists in a dissolving process whereby the copper contained in the roasted material is extracted.

As solvent, diluted crude sulfuric acid is used. This operation is carried out by means of mixers in which all the copper is converted into a concentrated solution of copper.

To separate entirely this solution of copper from the residual material, the contents of the mixers are passed through filter-presses. In such apparatus almost all the copper may be extracted by means of hot water with the result that the residues contain only 0.25 per cent. of copper.

The mother liquors, as well as the washing liquors, are collected in wooden tanks lined with lead in which the copper is precipitated by scrap iron in the state of a copper sponge (cement copper) which, after washing and drying, contains 80 to 90 per cent. of copper.

The larger portion of the zinc contained in the copper sweepings and scraps remains in the final solution from which it may be extracted according to requirements.

The chief advantages of this process are as follows:

1st.—Great simplicity of installation, requiring small expense for the first fitting-up;

2nd.—Great simplicity of operation allowing a permanent control and a very low cost price;

3rd.—Speedy extracting of copper in the form of a most valuable product;

4th.—Complete elimination of by-products.

I claim:

1. The herein described process of treating copper sweeps and scraps, which consists in roasting materials at a temperature below 600 degrees C. in the presence of raw chlorid of sodium (NaCl) to transform their entire copper content from the metallic form into a chlorid of copper which remains in the roasted material.

2. The herein described process of treating copper sweeps and scraps which consists in roasting said materials in the presence of raw chlorid of sodium in order to transform their entire copper content into bichlorid of copper, forming a solution of said cupric chlorid and recovering all the copper from said solution.

In testimony whereof I have signed my name to this specification in the presence of two subscribing witnesses.

CLEMENT CAMILLO CITO.

Witnesses:
CHARLES KENOTTE,
EMIL VAN WONSEEH.